United States Patent [19]
Matsuyama et al.

[11] Patent Number: 5,689,318
[45] Date of Patent: Nov. 18, 1997

[54] COLOR LIQUID CRYSTAL DISPLAY DEVICE COMPOSED OF COLOR FILTER WITH A LAYER OF THREE PRIMARY COLOR ARRAY PATTERNS FABRICATED BY THERMAL DYE TRANSFER TECHNOLOGY

[75] Inventors: Shigeru Matsuyama; Yoshifumi Tomita, both of Mobara, Japan

[73] Assignee: Hitachi, Ltd., Tokyo, Japan

[21] Appl. No.: 415,942

[22] Filed: Apr. 3, 1995

[30] Foreign Application Priority Data

Apr. 6, 1994 [JP] Japan ................... 6-068321

[51] Int. Cl.⁶ ............... G02F 1/1335; G02F 1/1333; G03F 9/00
[52] U.S. Cl. ............... 349/106; 349/110; 430/7
[58] Field of Search ............... 359/68, 67, 74; 349/106, 108, 110, 122; 430/7

[56] References Cited

U.S. PATENT DOCUMENTS

| | | |
|---|---|---|
| 4,644,338 | 2/1987 | Aoki et al. ............... 359/68 |
| 4,946,827 | 8/1990 | Harrison et al. ............... 430/7 |
| 4,962,081 | 10/1990 | Harrison et al. ............... 430/7 |
| 4,991,936 | 2/1991 | Simons ............... 430/7 |
| 5,042,920 | 8/1991 | Yoshino et al. ............... 359/68 |
| 5,158,927 | 10/1992 | Bailey et al. ............... 430/7 |
| 5,166,124 | 11/1992 | Weber ............... 349/106 |
| 5,166,126 | 11/1992 | Harrison et al. ............... 430/7 |
| 5,229,232 | 7/1993 | Longobardi et al. ............... 430/7 |
| 5,262,379 | 11/1993 | Bailey et al. ............... 430/7 |
| 5,400,157 | 3/1995 | Won ............... 359/68 |
| 5,418,094 | 5/1995 | Sato et al. ............... 359/67 |
| 5,477,355 | 12/1995 | Sasaki et al. ............... 359/74 |
| 5,495,354 | 2/1996 | Jo ............... 359/67 |
| 5,614,465 | 3/1997 | Long et al. ............... 349/106 |

FOREIGN PATENT DOCUMENTS

| | | | |
|---|---|---|---|
| 63-226623 | 9/1988 | Japan | ............... 359/68 |
| 2-105113 | 4/1990 | Japan | ............... 359/68 |
| 2-235019 | 9/1990 | Japan | ............... 359/68 |
| 2-275903 | 11/1990 | Japan | ............... 359/68 |
| 3-7911 | 1/1991 | Japan | ............... 359/68 |
| 4-147214 | 5/1992 | Japan | ............... 359/68 |
| 4-326328 | 11/1992 | Japan | ............... 359/68 |
| 5-19117 | 1/1993 | Japan | ............... 359/68 |
| 5-303014 | 11/1993 | Japan | ............... 359/68 |
| 6-130221 | 5/1994 | Japan | ............... 359/68 |
| 6-194644 | 7/1994 | Japan | ............... 359/68 |
| 6-242310 | 9/1994 | Japan | ............... 359/68 |

*Primary Examiner*—William L. Sikes
*Assistant Examiner*—Tiep H. Nguyen
*Attorney, Agent, or Firm*—Antonelli, Terry, Stout & Kraus, LLP.

[57] ABSTRACT

A color liquid crystal display device comprising a color filter having a structure including a black matrix BM formed on a transparent substrate, a colored layer FIL colored into at least three primary colors and formed by thermal dye transfer technology, a protective area for protecting against dye diffusion filling the gaps between the colored patterns, a transparent protective overcoat PSV2 formed on the colored layer and a transparent conductive electrode ITO2 formed on the transparent protective overcoat. The protective area against dye diffusion is constituted of a not-colored part FIL(T) of a dye receiving layer, protective overcoats PSV2 and PSV3, or of a black matrix with a high heat resistance.

6 Claims, 11 Drawing Sheets

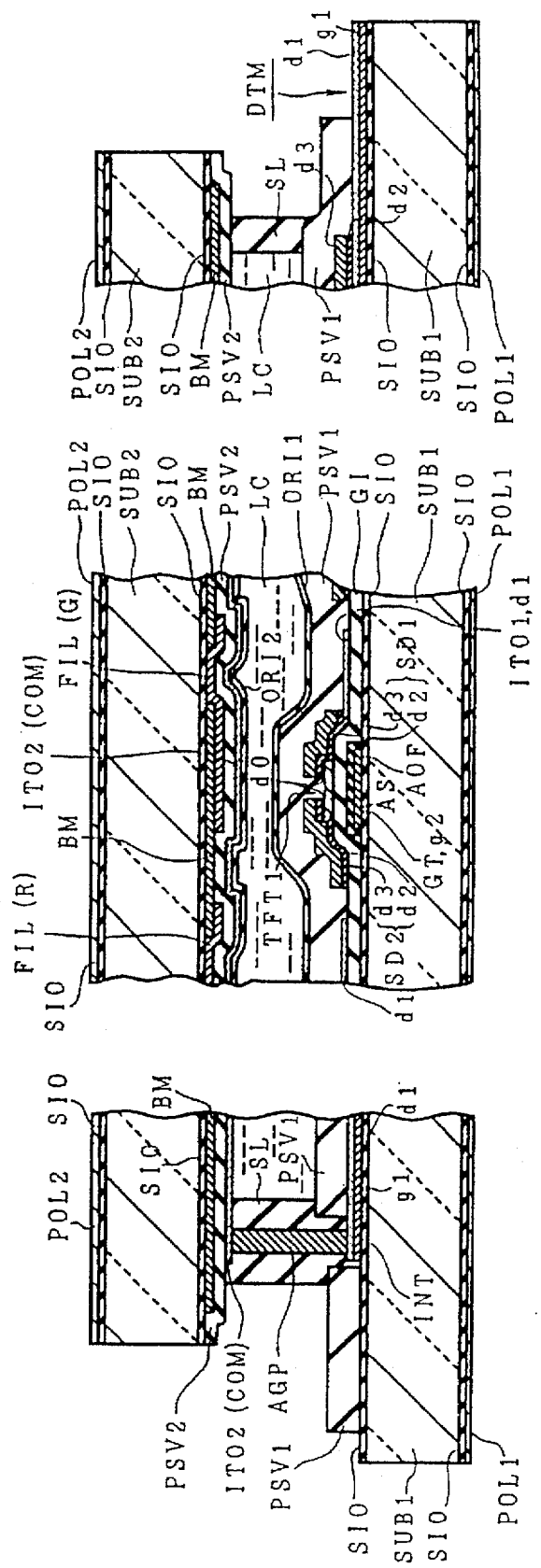

COLOR LIQUID CRYSTAL DISPLAY DEVICE COMPOSED OF COLOR FILTER WITH A LAYER OF THREE PRIMARY COLOR ARRAY PATTERNS FABRICATED BY THERMAL DYE TRANSFER TECHNOLOGY

BACKGROUND OF THE INVENTION

The present invention relates to a color liquid crystal display device, particularly to a color liquid crystal display device provided with a color filter fabricated by employing the principle of thermal dye transfer technology.

FIGS. 10(a) to 10(c) shows sectional views of a conventional active-matrix color liquid crystal display device as an example of a color liquid crystal display device of the type to which the present invention is directed. As shown in the drawing a bottom transparent glass substrate SUB1 and a top transparent glass substrate SUB2 are provided on respective sides of a liquid crystal layer LC. Moreover, a thin-film transistor TFT1 comprising a gate electrode GT, gate insulating films AOF and GI, a semiconductor layer AS, and source and drain electrodes SE1 and SD2, and a transparent conductive electrode ITO1 are formed on the transparent glass substrate SUB1 side, and moreover a transparent protective overcoat PSV1 and a lower orientation film ORI1 are formed in order. A light-shielding film BM serving as a black matrix, color filters FIL(R), FIL(G), and FIL (B), a transparent protective overcoat PSV2, a con, non transparent conductive electrode ITO2(COM), and an upper orientation film ORI2 are formed in order on the inside surface (liquid crystal LC side) of the top transparent glass substrate SUB2. Silicon oxide films SIO formed through dipping are provided on both sides of the transparent glass substrates SUB1 and SUB2. A sealing pattern SL is formed along the perimeters of the substrates SUB1 and SUB2 and between the transparent glass substrates SUB1 and SUB2 so as to seal the liquid crystal LC except for a liquid crystal sealing hole. The sealing material is made of, for example, an epoxy resin. The common transparent conductive electrode ITO2(COM) on the top transparent glass substrate SUB2 side is connected to a lead wire INT formed on the bottom transparent glass substrate SUB1 side by a silver paste material AGP at least at one portion of the four corners of a panel in this embodiment. The lead wire INT is formed using the same fabrication process as that of a gate terminal not illustrated in, and a drain terminal DTM.

The orientation films ORI1 and ORI2, the transparent conductive electrode ITO1, and the common transparent conductive electrode ITO2 are formed inside the sealing pattern SL. Polarizing plates POL1 and POL2 are formed on the outside surfaces of the bottom transparent glass substrate SUB1 and the top transparent glass substrate SUB2, respectively. The liquid crystal LC is sealed in a space defined by the sealing pattern SL between the upper orientation film ORI1 and the lower orientation film ORI2, both for setting the orientation of the liquid crystal molecules. The lower orientation film ORI1 is formed on the transparent protective overcoat PSV1.

The liquid crystal display device of the present invention is fabricated by forming various layers on the bottom transparent glass substrate SUB1 side and the top transparent glass substrate SUB2 side separately, forming the sealing pattern SL on the substrate SUB2 side, joining the bottom transparent glass substrate SUB1 and the top transparent glass substrate SUB2 together, pouring liquid crystal LC through an opening of the sealing material SL, closing the sealing hole with epoxy resin or the like, and cutting the top and bottom substrates.

Therefore, the i-type semiconductor layer AS of the thin-film transistor TFT1 is sandwiched by the light-shielding film BM thereabove and the slightly large gate electrode GT thereunder so that it is shielded from external natural light or backlight. The light-shielding film BM is formed like a grid around each pixel element (so-called black matrix) and the effective display area of each pixel element is defined by the grid. Therefore, the contour of each pixel element is made clear by the light-shielding film BM and the contrast is improved. That is, the light-shielding film BM has two functions: shielding of the i-type semiconductor layer AS from light and a black matrix.

The light-shielding film BM, as shown in FIG. 10, is formed like a frame also at the periphery, and its pattern is formed continuously with a pattern of a matrix section having dot-like openings. The light-shielding film BM at the periphery is extended to the outside of the sealing section SL to prevent leakage light, such as reflected light attributive to an apparatus mounted with this crystal display device, such as a personal computer, from entering the matrix section. Moreover, the shielding film BM is formed 0.3 to 1.0 mm inside from the edge of the substrate SUB2 so as to avoid the cut area of the substrate SUB2.

An active-matrix liquid crystal display device using a thin-filmtransistor is disclosed, for example, in Japanese Patent Laid-Open No. 309921/1988 and "Jocho koseiwo saiyoshita 12.5-type akutibu matorikusu hoshiki kara ekisho disupurei", Nikkei Electronic, pp. 193–210, issued by Nikkei McGraw-Hill Inc., Dec. 15, 1986. The disclosed embodiment is of an active matrix type. However, the light-shielding black matrix pattern BM is not always necessary for a color liquid crystal display device using an inexpensive super-twisted nematic (STN) liquid crystal or a twisted nematic (TN) liquid crystal because thin-film transistors are not used. The present invention relates to an ordinary color liquid crystal display device. Therefore, also in this case, the present invention can be applied to processes other than the black matrix process.

Conventionally, to form a color filter for a liquid crystal display device, the dyeing method, pigment dispersion method, electrodeposition method, and printing method have been used so far, which mainly involve a photolithography technique. FIG. 11 shows a fabrication method according to the pigment dispersion method using a photolithography process which is most popular among these methods. The BM forming process includes a process for forming a metallic chromium film or the like on a black matrix and thereafter forming a pattern by photoetching, and a process for adding a black colorant to a photosensitive resist, coating it and thereafter forming a pattern by photolithography. In the process for forming pixel elements of a color filter array, photosensitive resist containing pigment particles is coated and thereafter exposure and development are repeated for red (R), green (G), and blue (B) to form a pattern.

FIG. 12 shows a structural sectional view of a general color filter formed by the fabrication method shown in FIG. 11. In FIG. 12, symbol ITO2 denotes a transparent conductive electrode formed on the color filter surface, PSV2 denotes a transparent protective overcoat formed on colored layers, in which FIL(R), FIL(G), and FIL(B) denote colored pixel elements, SUB2 denotes a glass substrate, and BM denotes a black matrix. A silicon oxide film SIO may not be formed depending on the purpose or the material of the transparent substrate SUB2.

As shown in FIG. 12, the color filter normally has a structure in which the protective overcoat layer PSV2 is formed on the colored layers FIL(R), FIL(G), and FIL(B) whose pattern area is separated like a mosaic, a vertical or horizontal stripe for each pixel element or each color, and moreover, the transparent conductive electrode ITO2 is formed on the layer PSV2. By forming the above color filter structure, it is possible to improve the heat resistance of the color filter to a temperature close to 200° C. due to vapor deposition and sputtering in forming the transparent conductive electrode ITO2, and the thermal treatment in the module process after the vapor deposition and sputtering up to a level in which the color filter can practically be used, and thereby a color filter with a high color reproducibility is formed.

Methods for simultaneously performing formation of three primary colors have been studied for practical use in order to reduce the fabrication cost and improve the productivity. The thermal dye transfer technology is one of these methods. The thermal dye transfer technology applied to color printing used for color copying machines and video printers will be described below. FIG. 13(a) shows the fabrication process and FIG. 13(b) shows a typical example of the fabrication system. The resist applying process is a process for forming image receiving paper. In the case of this example, a dye image-receiving layer is provided by a coating process on a base paper and a protective layer for protecting against abnormal image transfer is formed on the dye image-receiving layer. The protective layer prevents ink from thermally diffusing up to an undesired area at the time of thermal dye transfer. In the present invention, however, no protective layer for protecting against abnormal image transfer is used because a protective area against dye diffusion is formed which prevents dye from thermally diffusing up to an undesired area as a result of the structure of the color filter. Then, the image receiving paper is colored in the thermal dye transfer process. A thermal dye transfer film 2 is a film wherein a stick resistant layer is formed on one side of a base film made of polyethylene terephthalate or the like and a colorant is formed on the other side. The color of the colorant is realized through a color mixing method by using three primary colors of yellow (Y), cyanogen (C), and magenta (M). The thermal dye transfer technology generally uses two methods according to the types of coloring material. By the first method a coloring material is produced by mixing a colorant such as pigment with, for example, wax. Pigment is transferred to an object to be colored together with the wax through heating. The advantage of using the colorant is that plain paper can be used as the object to be colored. The second method uses a base film coated with a mixture of a sublimatable dye and a binder resin as an ink layer 3. In this case, the object transferred when heated is the dye. The second method uses the sublimation of the dye due to heating. A dye receiving layer requires a transparent macromolecular dyeing resin film layer.

Since the present invention involves a problem concerning the fact that a transparent substrate, such as a glass substrate is used instead of base paper, the method using wax becomes unsuitable from the point of view of the heat resistant characteristic, and so the second method is used as a better choice in accordance with the present invention. Though the present invention uses a thermal head as a heat-generating body 4, it is also possible to use a laser.

An example in which the second method of the thermal dye transfer technology is applied to the color filter of a color liquid crystal display device is shown in the following documents: D. J. Harison and M. C. Olidfield, "The Use of Thermal Dye Transfer Technology for the Fabrication of Color Filter Arrays", Proceeding of the 9th International Congress on Advances in Non-Impact Printing Technologies, pp. 382–384 (1993) and U.S. Pat. No. 5,166, 126.

Though the colored layer of a conventional color filter is fabricated by a method mainly using a photolithography process, as shown in FIG. 11, the method is the primary cause of an increase in cost because it requires a long fabrication process. Moreover, because the photolithography process always includes light exposure processes, the method requires a mask with a higher accuracy as a pattern becomes more fine. Furthermore, a development process using liquid chemicals is indispensable in order to pattern a macromolecular layer exposed to light. Furthermore, to form three colored layers of red (R), green (G), and blue (B), a problem arises in that the above exposure and development processes must be repeated at least three times. Furthermore, there are problems that, when they are actually used for a liquid crystal device, the liquid crystal-driving transparent electrodes on a protective overcoat are not properly formed since the three colored layers have different thicknesses because they are separately formed, or a film thickness variation of the liquid crystal LC between pixel elements increases when assembling a liquid crystal device, while maintaining a certain gap with an opposed electrode substrate. For an STN-type liquid crystal device, in particular, it is necessary to further decrease the film thickness variation of the liquid crystal LC compared to a TN-type liquid crystal device in order to improve the response speed and the view angle characteristic. Therefore, if there is fill thickness variation of the liquid crystal LC in a certain plane, defective color irregularity occurs at the portions where the thickness is uneven and this is very disadvantageous for stabilization of the optical characteristics.

It is possible to simplify the coloring process by using a conventional thermal dye transfer technology using a sublimatable dye as a fabrication process as shown in FIGS. 13(a) and 13(b). However, because dyeing is performed by dye sublimation employing heat, there is a problem that the dye thermally diffuses from a colored pattern when it is subjected to high temperature and this causes color fading or tone change.

SUMMARY OF THE INVENTION

It is an object of the present invention to provide a color liquid crystal display device having a high productivity, superior optical characteristics and a high reliability completely meeting the operational environmental conditions required by users, wherein the heat resistance is improved to prevent color mixing of dyes, and the variation of the gap between ITO1 and ITO2, serving as liquid-crystal-driving transparent electrodes in each pixel element, is minimized by using the thermal dye transfer technology as a fabrication process and by using an excellent color filter structure.

To achieve the above object, pixel elements of color filter array of three primary colors are formed by thermal dye transfer. It is a feature of the invention that coloring does not require a mask because there is no exposure process and, for example, data drawn by a computer can directly be transferred. Moreover, the process for forming a black matrix and a transparent conductive electrode uses an ordinary photolithography technique. Furthermore, the materials of a black matrix a, dye receiving layer, a protective overcoat, and a transparent conductive electrode are commercially available materials or those disclosed in the laid-open patent application to be described later. Furthermore, ordinary vapor deposition, sputtering, or a coating method is used to form the black matrix, protective overcoats and transparent conductive electrode films.

The material of a protective area for protecting against dye diffusion for filling the gap between patterns formed by the above means acts to prevent dyes from horizontally thermally diffusing due to heat and causing color fading or color mixing, though depending on the required heat resistance. Moreover, it has the capability of preventing dyes from vertically thermally diffusing and of compensating the weak point of low heat resistance by covering the colored layer with a transparent protective overcoat formed on the colored layer. Furthermore, the transparent protective overcoat has the characteristic of further covering the colored layer with a thickness almost equal to that of a layer formed by thermal dye transfer technology and of further flattening the surface.

The foregoing and other objects, advantages, manner of operation and novel features of the present invention will be understood from the following detailed description when read in connection with the accompanying drawings.

BRIEF DESCRIPTION OF THE DRAWINGS

FIGS. 10(a)–(c) are sectional views of essential parts of an active addressing liquid crystal display device;

DESCRIPTION OF THE PREFERRED EMBODIMENTS

Figure 1:
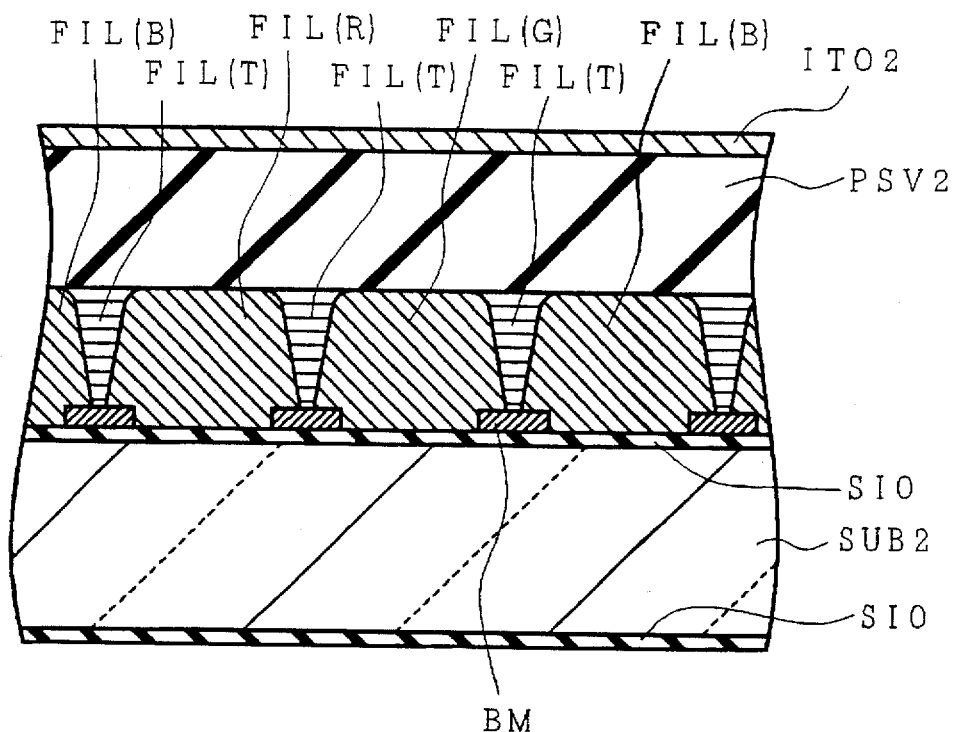
FIG. 1 is a sectional view of an essential part of an embodiment of the color filter structure of the present invention.

The color liquid crystal display device fabricated by the present invention and its typical fabrication method will be described below. In all drawings, parts having the same functions are denoted by the same reference characters and their repetitive description will be omitted.

(Embodiment 1)

Figure 12:
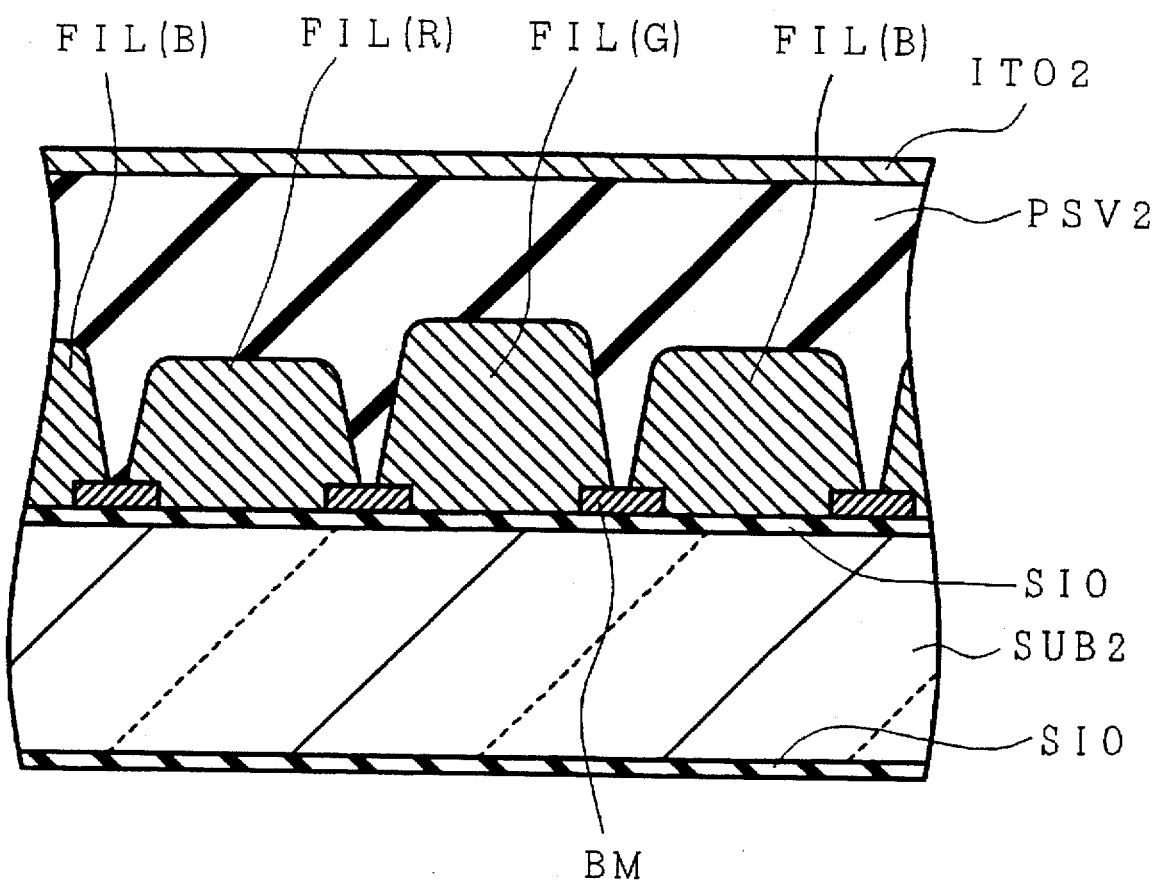
FIG. 12 is a sectional view of an essential part of a color filter fabricated by the conventional fabrication method.
Figure 13:
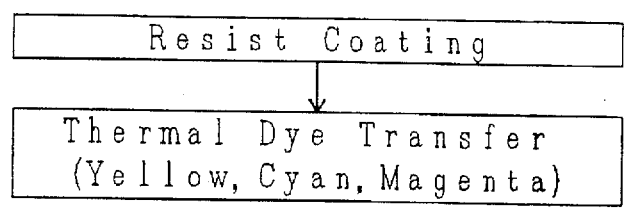
FIGS. 13(a)–(b) are a process charts showing the conventional fabrication process according to the thermal dye transfer technology and an illustration showing its fabrication system.
Figure 13:
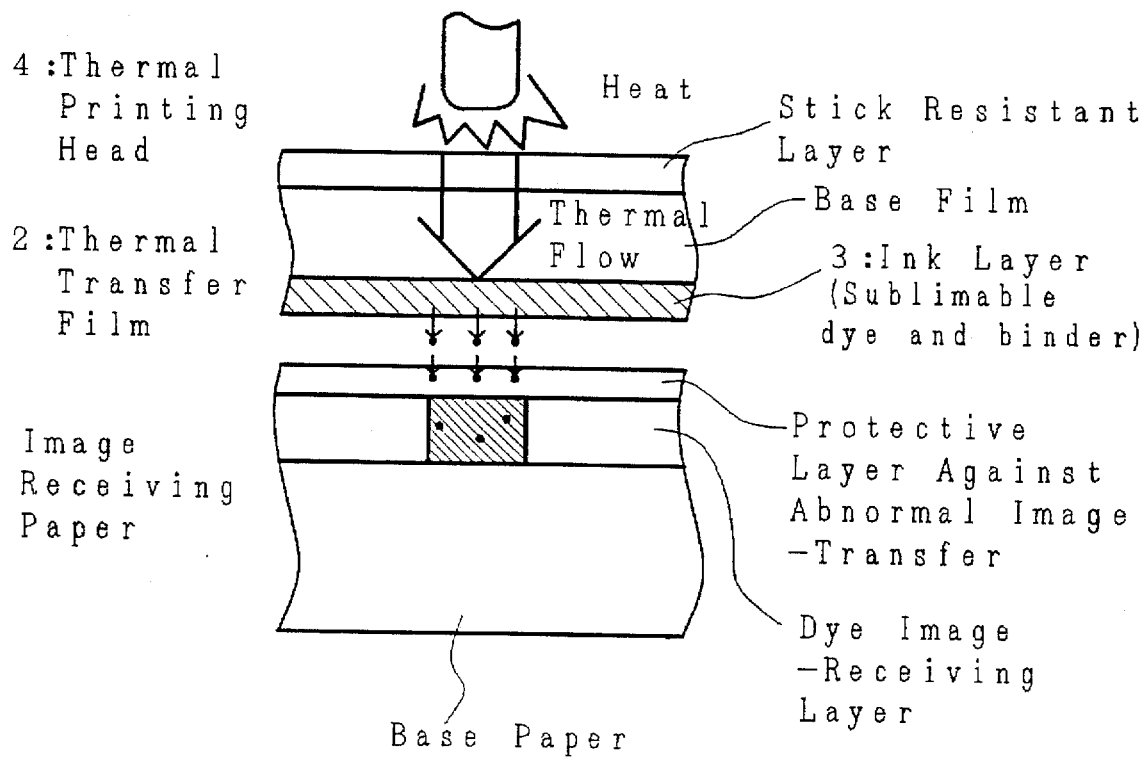

FIG. 1 shows a sectional view of the color-filter-side substrate of the present invention. Parts having the same functions as those shown in FIG. 12 are denoted by the same reference characters. In FIG. 1, FIL denotes a colored layer. However, unlike the case in FIG. 12, FIL(R), FIL(G), and FIL(B) are formed by coloring them in a dye receiving layer 1 and the areas are divided by uncolored portions of FIL(T), so that colors are not superimposed. FIGS. 6(a) to 6(d) show a flow of the process for fabricating the color-filter-side substrate of the present invention. A black matrix BM was formed on a glass substrate SUB2 or on a coating layer SIO on the glass substrate SUB2. This embodiment used a metallic chromium fill with a thickness of 800 to 1200 Å, considering the light-shielding effect. Moreover, it was also possible to use a multilayer fill made of metallic aluminum, nickel, or chromium oxide and chromium. Furthermore, a photosensitive organic fill containing a colorant for blackening could be used. In this case, the fill thickness was determined from the transmittance required. As commercially available materials, CK-5001 manufactured by Fuji-Hunt Electronics Technology Co., Ltd. and BKR Series manufactured by Nippon Kasei Chemical Co., Ltd. are examples. Both of them comprise a mixture of carbon and a black pigment or carbon and three-primary-color pigments. The black matrix forming method used a photolithography process in order to improve the whole dimensional accuracy and serve as a reference for forming other pixel elements of the color filter array. As described above, a transparent dye receiving layer 1 having a thickness of up to about 3 μm was provided onto a substrate with a black matrix formed thereon by means of spin coating or the like and thereafter it was dried by heating. Various materials were considered as the material of the dye receiving layer 1. In the case of this embodiment, for the dye receiving layer 1, a resin composition of an aromatic-containing material which had a negative photosensitivity and to which acryloyl group was added was chiefly used. It is possible to use a novolak resin as the aromatic-containing material. These photosensitive resin compositions are disclosed in Japanese Patent Laid-Open Nos. 175753/1992 and 175754/1992. It is also possible to use polycarbonate, vinyl chloride, polyurethane, polyester, polyamide, polyacrylonitrile, and polycaprolactam disclosed in U.S. Pat. Nos. 4,923,860, 4,962,081, and 5,073,534. In this embodiment, it is unnecessary to form a pattern of a colored layer. Therefore, it is also possible to use non-photosensitive materials such as Vilon #200 which is a polyester resin manufactured by Toyobo Co., Ltd., cellulose acetate resin, polystyrene, polypropylene, polyethylene terephthalate, and acrylic resin.

The transparent dye receiving layer 1 was formed on the black matrix BM and thereafter colored by partially heating the layer 1 through the thermal dye transfer film 2 of a polyethylene-terephthalate base film with a thickness of, for example, 4 μm previously coated with a sublimatable dye 3 and using the sublimation property of the dye. The sublimatable dye 3 had to be selected in accordance with the type of the dye receiving layer 1. In this embodiment, as the sublimatable dye 3, a disperse dye and a cation dye manufactured by Nippon Kayaku Co., Ltd. are used. For example, for three primary colors, two sets of dyes were used: One set is Kayaset Red B or Kayaset Scarlet 926 for a red color, a mixture of Kayaset Yellow A–G and Kayaset Blue 714 for a green color, Kayaset Blue 714 for a blue color; and another set is Kayaset Yellow A–G for a yellow color, Kayaset Blue 714 for a cyan color, and Kayaset Red B for a magenta color.

For partial heating, though a thermal head was used as a heat-generating body 4, it was also possible to use a laser. To form a precise pattern, a laser is generally used. In the case of this embodiment, the colored areas FIL(R), FIL(G), and FIL(B) were divided by providing the protective area against dye diffusion with a transparent non-colored area FIL(T), so that color mixing was prevented, because the dye diffusing areas were covered within a black matrix area, even if dyes diffused in the horizontal direction in the sputtering process for forming the transparent conductive electrode IT02 and in subsequent various annealing processes.

In the case of this embodiment, the edges of the colored areas FIL(R), FIL(G), and FIL(B) were superimposed with the black matrix. However, it was considered that the diffusibility might increase depending on a combination of the sublimatable dye 3 and the dye receiving layer 1. Therefore, it was necessary to further expand the transparent non-colored area FIL(T). Moreover, the transparent protective overcoat PSV2 was formed on the colored layer FIL in order to improve the heat resistance as a color filter. Though depending on a dye receiving material, because a sublimatable dye was used, color fading occurred at the boundary between the colored areas FIL(R), FIL(G), and FIL(B) around the sublimation temperature of the dye and it was observed as a deterioration of a color filter. Therefore, the transparent protective overcoat PSV2 was formed on the colored layer in order to prevent dyes from vertically diffusing or sublimating. Various types of materials were considered as the protective overcoat material. However, to serve as an electrode base film of a liquid crystal device, various chemical and physical characteristics were required of the material; for example, it was possible to form a flat surface with a flatness of 0.2 µm or less, the adhesion to the sealing material SL for bonding upper and lower electrode substrates was good, and the material did not affect the liquid crystal material LC to be sealed in. In this embodiment, a material obtained by mixing predetermined quantities of amionosilane-modified epoxy resin, ether of novolak resin and glycidyl, novolak resin, and organic solvent, disclosed in Japanese Patent Laid-Open No. 96920/1992 was used and applied up to a thickness of 2 to 3 µm. Moreover, it is possible to use an epoxy-based thermosetting resin with a good adhesion to glass. Because the thermal deformation temperature of the thermosetting resin can be set high, the heat resistance of a color filter is resultingly improved and moreover a sufficient flatness is achieved for the base of the transparent conductive electrode IT02.

In this embodiment, the transparent conductive electrode ITO2 was formed on the transparent protective overcoat PSV2 through sputtering and a pattern was formed through photolithography. In the case of an active matrix, a portion on which the transparent conductive electrode ITO2 is not formed is previously covered with a frame having an opening at its center and thereafter a film is formed through sputtering, but patterning by photolithography may not be conducted.

(Embodiment 2)

Figure 2:
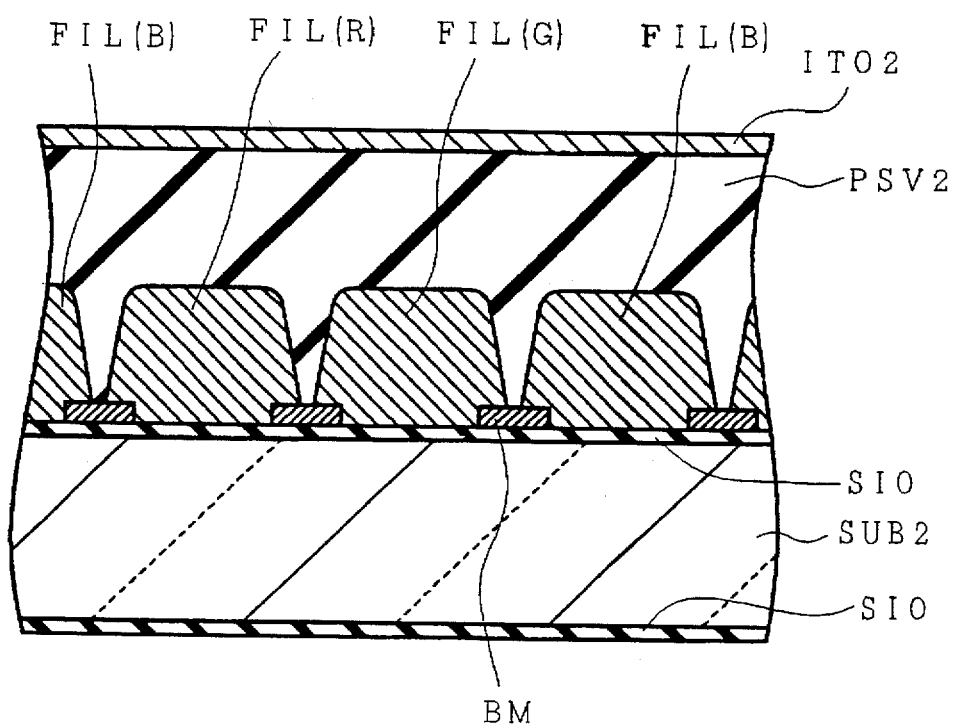
FIG. 2 is a sectional view of an essential part of an embodiment of the color filter structure of the present invention.

Moreover, as an example of improving the heat resistance, FIG. 2 shows a sectional view of an essential part of a color filter. The following is a fabrication process example, as shown in FIGS. 7(a) to 7(e). A photosensitive resin serving as the transparent dye receiving material 1 was first applied to the black matrix and thereafter the colored layer patterns FIL(R), FIL(G), and FIL(B) corresponding to each pixel element or each color were formed. This embodiment used the photosensitive resin described in Embodiment 1 for the dye receiving material 1. That is, a resin composition of an aromatic-containing material which has a negative photosensitivity and to which an acryloyl group was added was mainly used and applied to a film thickness of about 1 to 1.5 µm through spin-coating or the like. In the case of this embodiment, the patterns of all colors were simultaneously formed as the dye receiving layer 1 by only one photolithography process without repeating the photolithography process for each primary color, unlike the conventional method. A mosaic pattern, or a vertical or a horizontal stripe pattern was formed correspondingly to the color filter array arrangement. The section of three primary color patterns is shown FIG. 2, and they are divided into areas by separating patterns for each pixel element or color by grooves. The coloring method after the separation is the same as the case of (embodiment 1). The thickness of the dye receiving layer 1 can be decreased compared to that of (embodiment 1) because patterns are separated, and consequently thicker coloring is possible. Moreover, to improve the heat resistance as a color filter, a protective overcoat is formed on and between colored patterns. This structure makes it possible to effectively prevent color mixing and color fading of color patterns due to horizontal diffusion of a sublimatable dye caused by various types of heating in the liquid crystal fabrication process after dyeing. The process for forming the transparent conductive electrode IT02 on the transparent protective overcoat PSV2 is the same as that of (embodiment 1).

(Embodiment 3)

Figure 3:
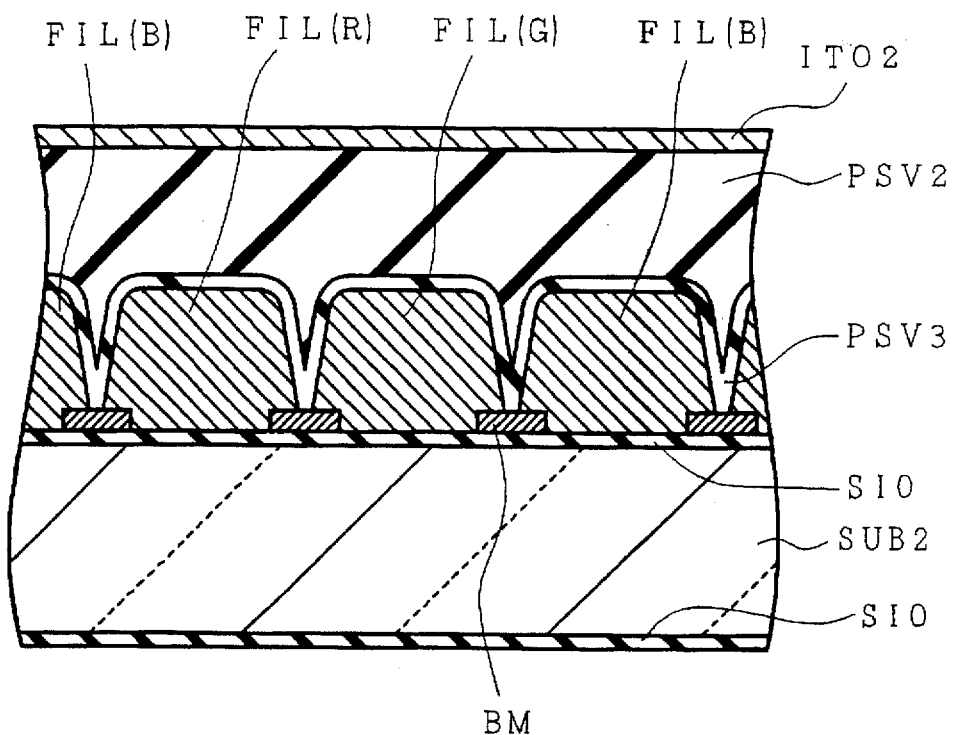
FIG. 3 is a sectional view of an essential part of an embodiment of the color filter structure of the present invention.

In (embodiment 2), colored layer patterns FIL(R), FIL(G) and FIL(B) corresponding to each pixel element or each color were formed. As shown in FIG. 3, however, a second dye diffusion stopper PSV3 was formed on the surface of the colored layers as a transparent inorganic fill or an organic fill having no dyeing function in order to further improve the dye diffusion preventive effect. In the case of this embodiment, $SiO_2$ was sputtered by a thickness of approx. 100 Å as an inorganic fill. However, because it was possible to use any transparent fill, the material of the transparent conductive electrode ITO2 can also be used. Though a film thickness of 50 to 100 Å is preferable, any film thickness is acceptable as long as it is possible to prevent dye from diffusing. Though film forming methods include sputtering and vapor deposition, it is necessary to select a method capable of forming a film at a low temperature. Though organic material is considered as the material of the dye diffusion stopper PSV3, it is preferable to select a material with a high transparency and a relatively high crosslinking density. Particularly, an acrylic-based resin is excellent which is used as a surface hardening film of a plastic lens or the like. Moreover, it is possible to use an epoxy-based material by considering the adhesion to the protective overcoat.

After the dye diffusion stopper PSV3 was formed, the transparent protective overcoat PSV2 was formed in order to improve the flatness between pixel elements. The transparent protective overcoat PSV2 used the material described in (embodiment 2). Moreover, the transparent conductive electrode ITO2 was formed on the transparent protective overcoat PSV2. Though a method and a structure for directly forming an electrode layer on the dye diffusion stopper PSV3 can be used, the structure in which the transparent protective overcoat PSV2 is formed is better when considering the flattening between pixel elements.

(Embodiment 4)

Figure 4:
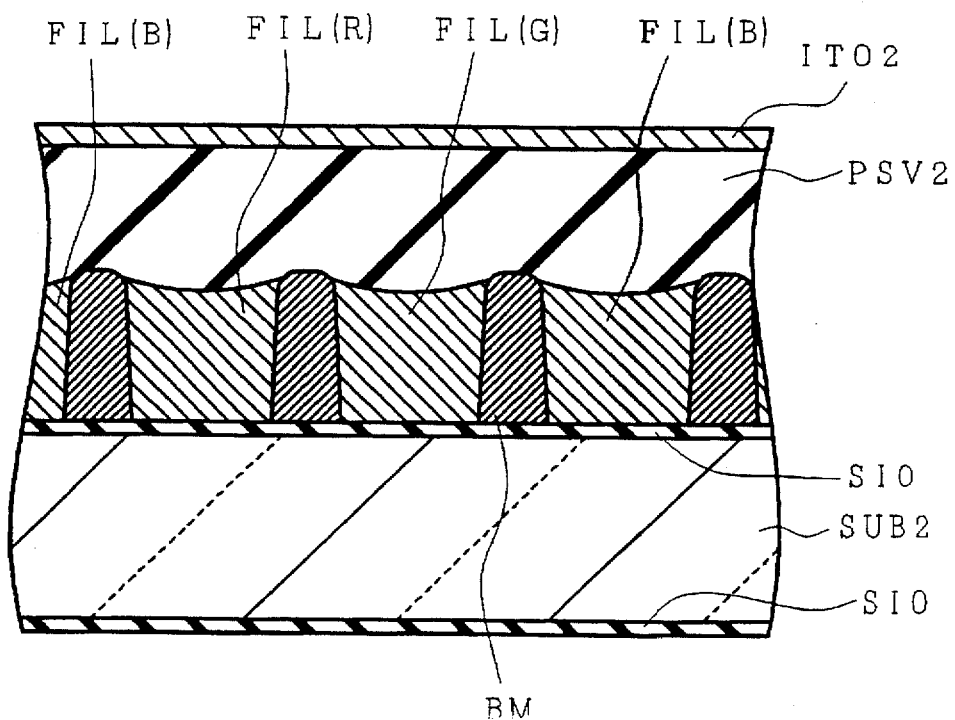
FIG. 4 is a sectional view of an essential part of an embodiment of the color filter structure of the present invention.

By filling the protective area against dye diffusion between colored patterns with a black matrix material superior in the heat resistance and having a low transmittance, it is possible to prevent the dye in a colored layer from diffusing in the lateral direction. FIG. 4 shows a sectional view of an essential part of the structure of a color filter according to this embodiment. FIGS. 8(a) to 8(e) show an example of the fabrication process. This embodiment used CK-5001 on the market manufactured by Fuji-Hunt Co., Ltd. or BKR Series on the market manufactured by Nippon Kasei Chemical Co., Ltd. for the black matrix material. Both were a mixture of carbon and a black pigment or, carbon and three-primary-color pigments, which comprises a photosensitive material to be cross-linked when exposed to light. A black matrix pattern was formed by photolithography so as to improve the whole dimensional accuracy and to serve as a reference for forming other pixel elements. The formed black matrix can be heated in an oven and stabilized so that it is not deformed or does not cause color fading due to subsequent thermal treatment. The film thickness of a black matrix is determined by the light-shielding characteristic of the black matrix which, is an optical characteristic. In the case of this embodiment, the film thickness was set to about 1.0 to 1.5 μm. As described above, the transparent dye receiving layer 1 was formed onto the substrate with the black matrix previously formed on it. For the dye receiving layer 1, a resin composition of an aromatic-containing material which had a negative photosensitivity and to which an acryloyl group was added was used and applied through spin-coating.

After the dye receiving layer 1 was applied, three primary color patterns were simultaneously formed by using the pattern of the black matrix BM instead of a mask through one exposure and one development process by means of back exposure to ultraviolet rays from an ultraviolet-ray source 5. In this case, it is desirable to remove the dye receiving material 1 from the outside of the outermost pattern of the black matrix BM because it may enter an effective pixel element section as foreign matter when cutting the substrate. In this embodiment, a square black light-shielding frame was provided between the dye receiving layer 1 and the ultraviolet ray source 5 to cover the dye receiving layer 1 so that ultraviolet rays pass through only the central opening during the exposure and strike at and around the pixel element forming portion. By this method, the dye receiving material 1 around the pixel element forming portion was removed simultaneously with the pattern formation of various colors at the time of development. The ultraviolet irradiation intensity and the development time were so determined that the difference in the film thickness between the black matrix and the dye receiving layer 1 after development was 0.5 μm or less. The method for coloring patterns into various colors hereafter was the same as the case of (embodiment 1). Moreover, a protective overcoat was formed on a colored layer in order to improve the heat resistance as a color filter. According to the above structure, the colored layer for each color was divided by a previously formed black matrix, so that color mixing due to diffusion of dyes in the same plane could be prevented as shown in FIG. 4. Furthermore, a transparent protective overcoat PSV2 was formed on the colored layer and the black matrix layer in order to improve the heat resistance as a color filter and thereafter the transparent conductive electrode ITO2 was formed on the transparent protective overcoat PSV2 by sputtering or the like. This embodiment makes it possible to ensure the heat resistance because the black matrix BM pattern serves as a layer for preventing dyes from diffusing in the lateral direction. Moreover, a dye receiving material can be patterned by the back exposure method in a self-alignment manner, the pattern accuracy is improved, and the number of processes decreases. Furthermore, the difference in the the film thickness of the patterns of the dye receiving layer from that of the BM pattern can be kept small. Therefore, it can be said that this is the optimum method.

(Embodiment 5)

Figure 5:
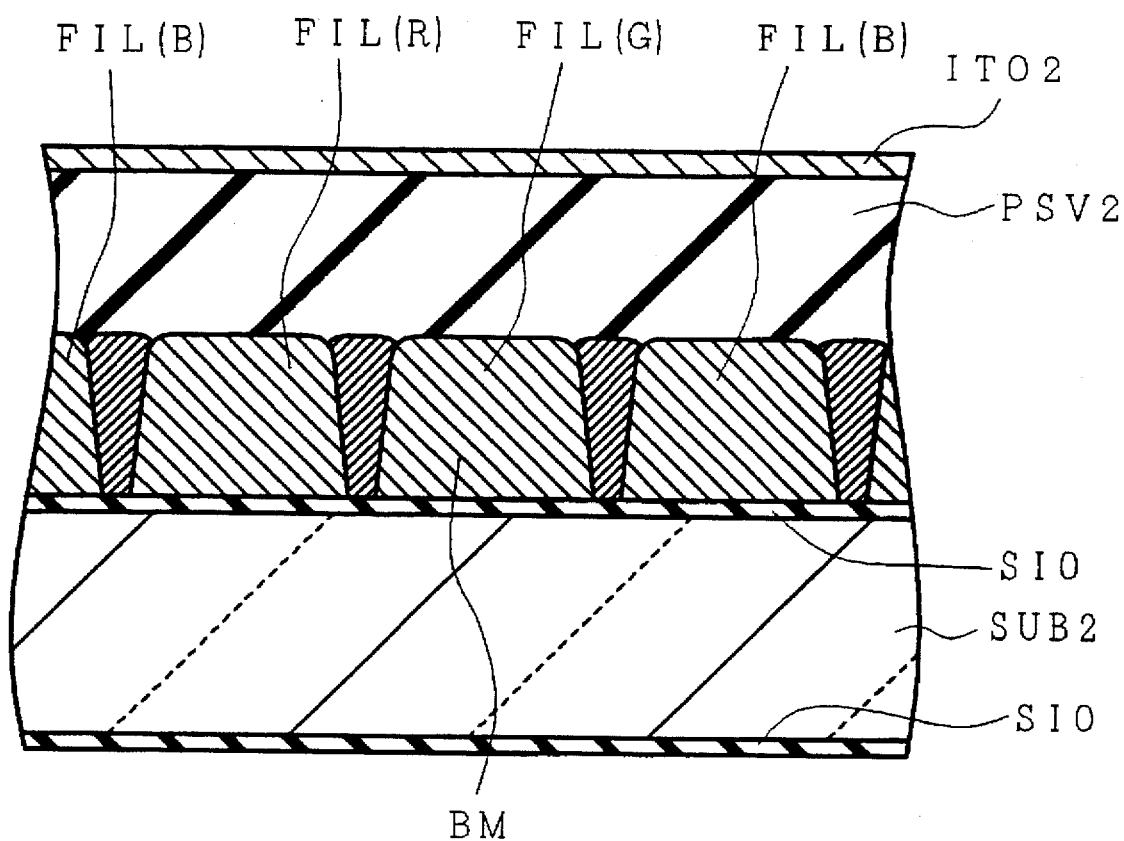
FIG. 5 is a sectional view of an essential part of an embodiment of the color filter structure of the present invention.
Figure 6A:
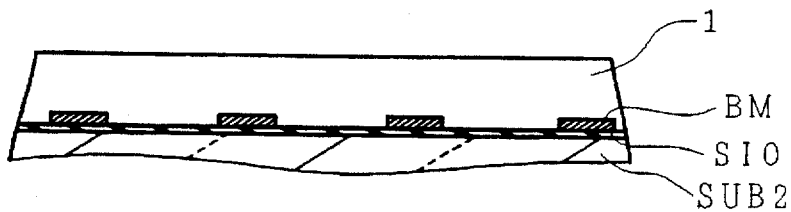
FIGS. 6(a)–(d) are sectional views of an essential part for explaining the color filter fabrication process of the present invention.
Figure 6B:
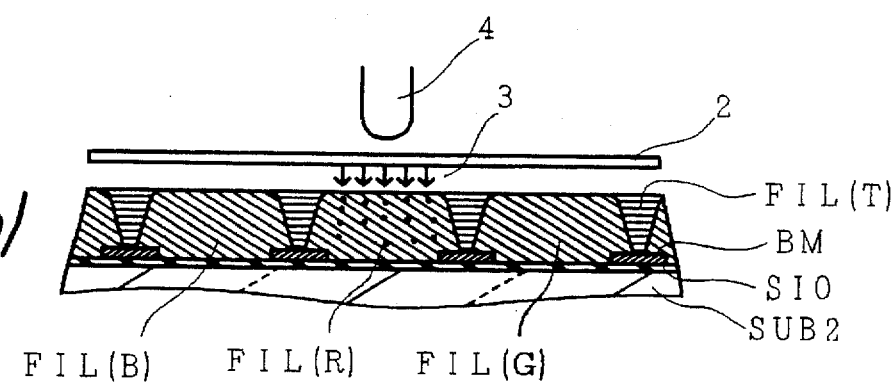
Figure 6C:
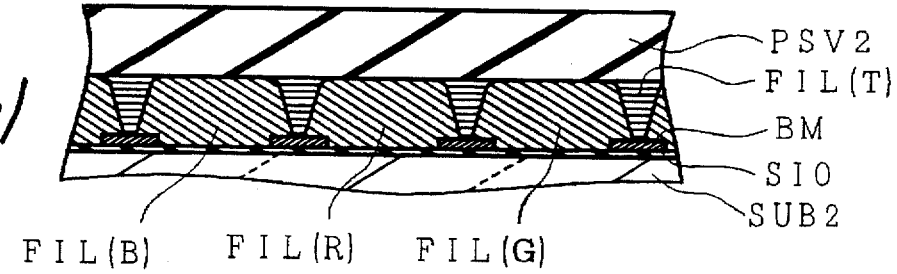
Figure 6D:
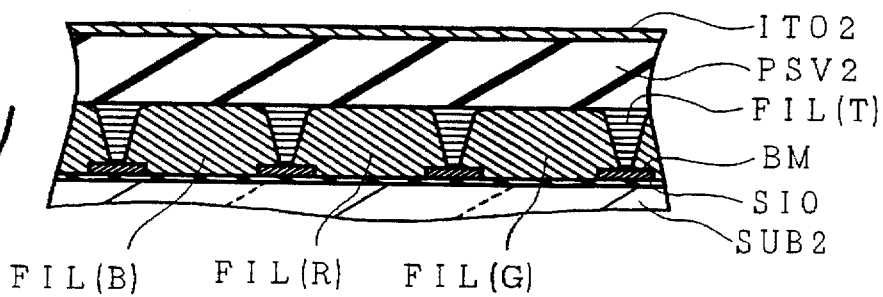
Figure 7A:
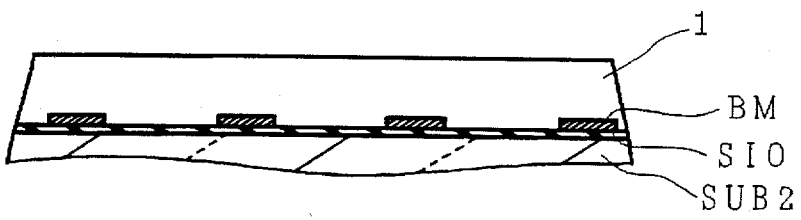
FIGS. 7(a)–(e) are sectional views of an essential part for explaining the color filter fabrication process of the present invention.
Figure 7B:
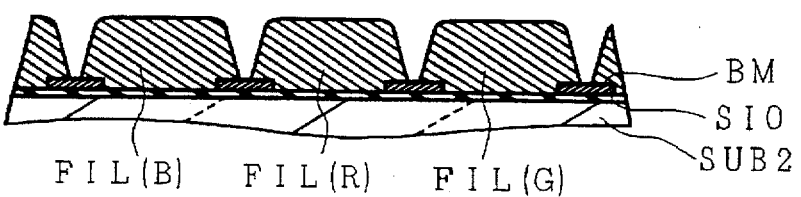
Figure 7C:
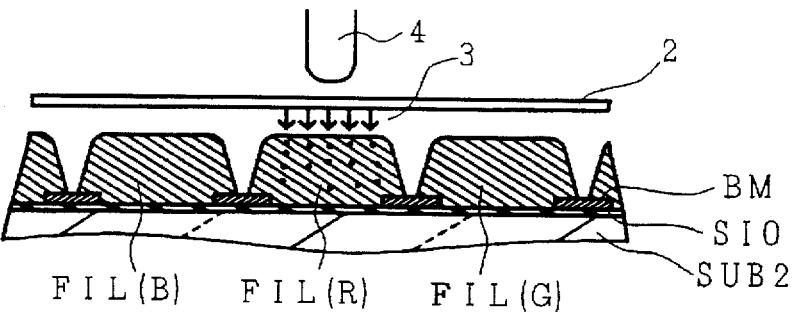
Figure 7D:
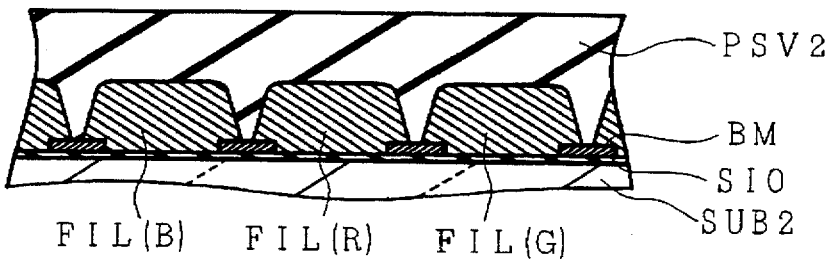
Figure 7E:
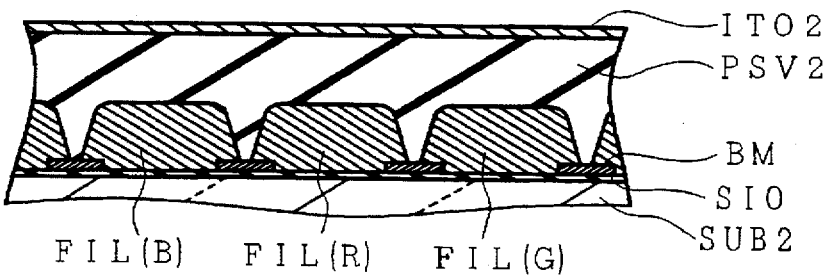
Figure 8A:
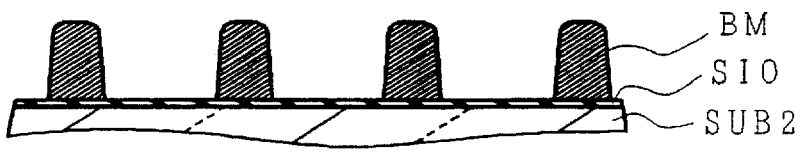
FIGS. 8(a)–(e) are sectional views of an essential part for explaining the color filter fabrication process of the present invention.
Figure 8B:
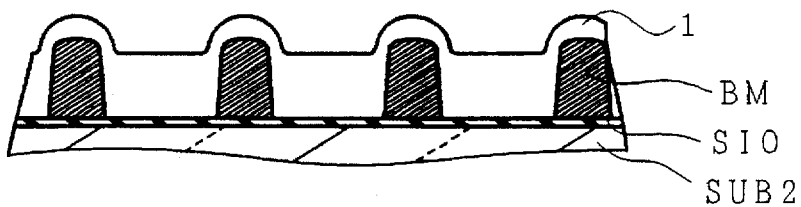
Figure 8C:
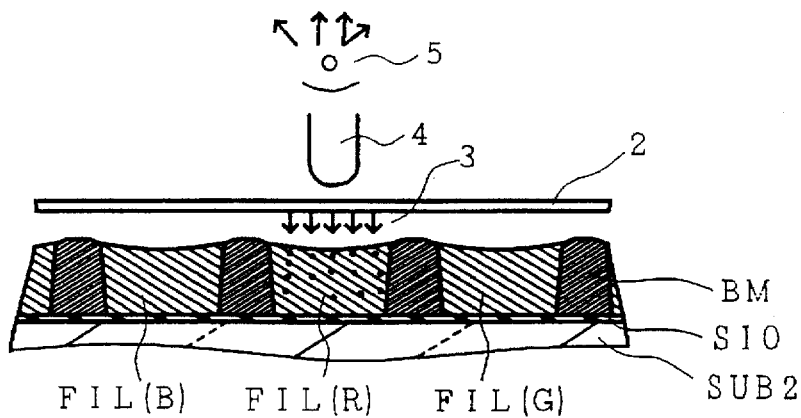
Figure 8D:
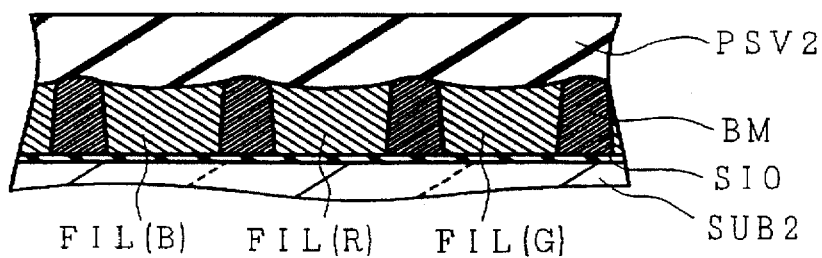
Figure 8E:
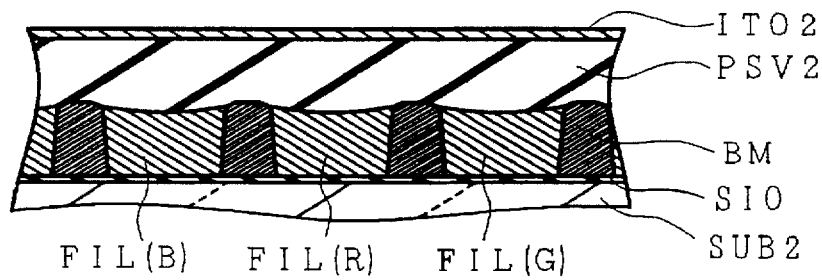
Figure 9A:
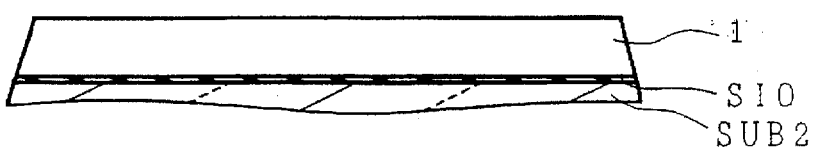
FIGS. 9(a)–(f) are sectional views of an essential part for explaining the color filter fabrication process of the present invention.
Figure 9B:
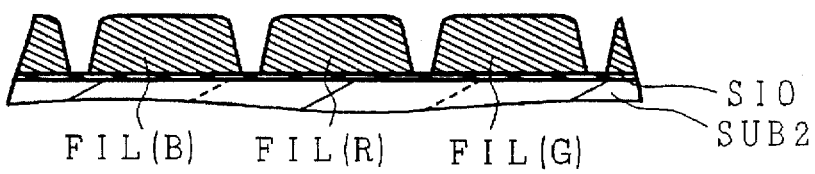
Figure 9C:
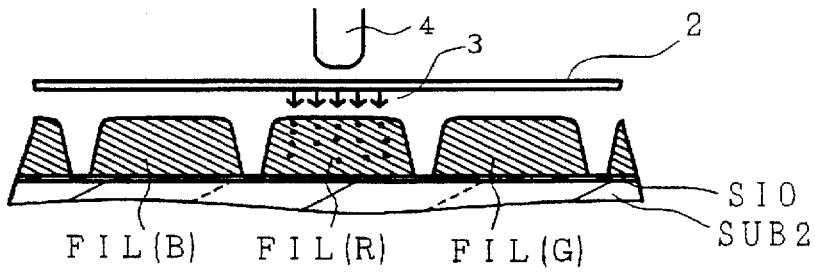
Figure 9D:
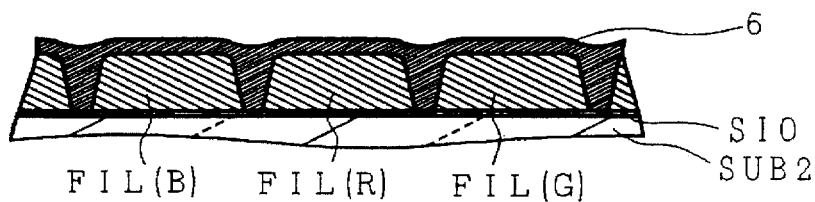
Figure 9E:
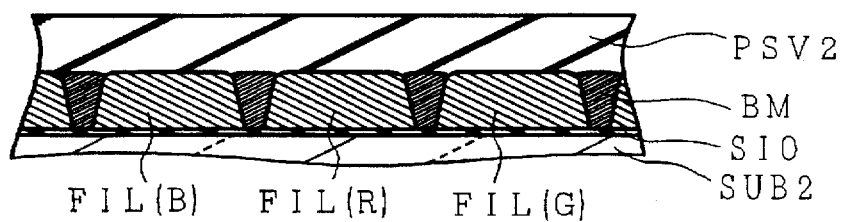
Figure 9F:
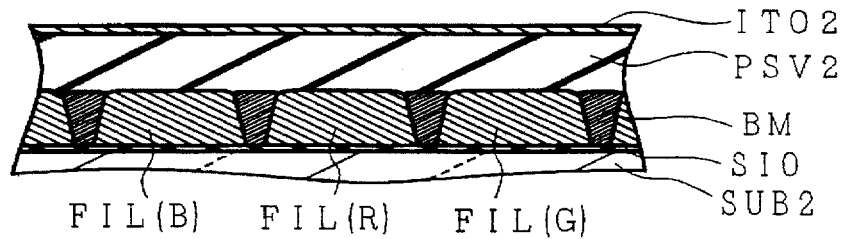
Figure 11:
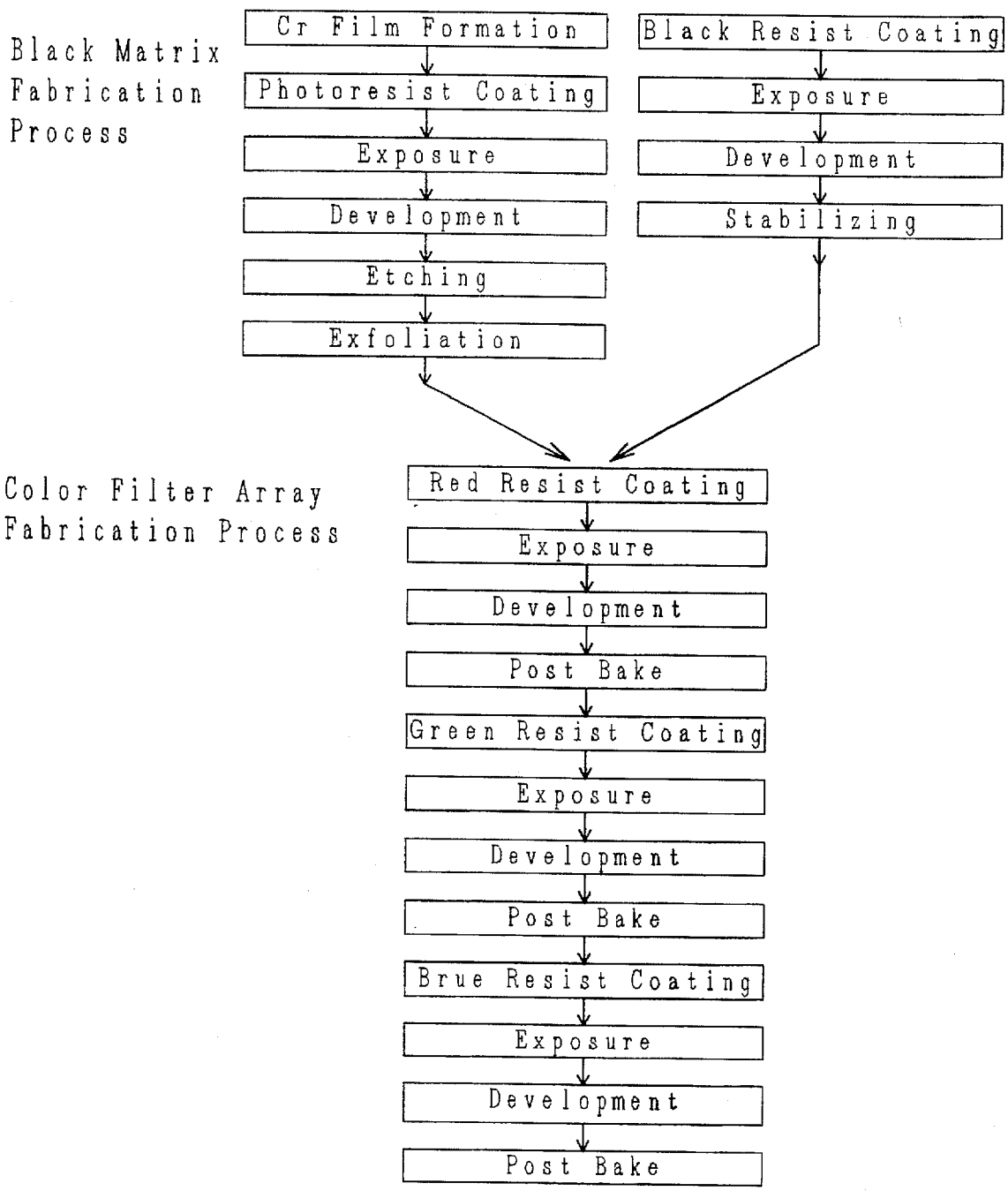
FIG. 11 is a process chart showing a conventional color filter fabrication method.

Though (embodiment 4) used a process of forming a black matrix and thereafter forming a colored layer, it is possible to reverse the process. FIG. 5 shows a sectional view of an essential part of the structure of the color filter of this embodiment. An example of the fabrication process is shown in FIGS. 9(a) to 9(f), in which the dye receiving layer 1 was first applied onto a transparent substrate in a range of film thickness of around 1.0 to 1.5 μm through spin-coating or the like. Thereafter, patterns corresponding to three primary colors were formed through exposure and development using an ordinary photolithography. In this case, the patterns were formed by setting gaps between the patterns and dividing them into areas. The method for coloring patterns into various colors hereafter was the same as the case of (embodiment 1). In the next process, a photosensitive black macromolecular material was applied by spin-coating or the like. The material shown in (embodiment 4) can be used as a black matrix material. Then, the photosensitive black macromolecular material in the gaps between three primary color patterns was cured by applying ultraviolet rays to the material from the glass substrate SUB2 side with the color patterns formed on it. Thereafter, unnecessary black macromolecular resin was removed by a developer. The ultraviolet exposure and the development time were adjusted so that the difference in the film thickness from those of the three primary color patterns is 0.5 μm or less as the film thickness from the transparent substrate made of the black macromolecular material. Moreover, a transparent protective overcoat PSV2 was formed on the colored layer and black matrix in order to improve the heat resistance as a color filter. Hereafter, the process for forming a transparent conductive electrode ITO2 on the transparent protective overcoat PSV2 through sputtering or the like was the same as that of (embodiment 1).

[Advantages of the Invention]

As described above, the color liquid crystal display device of the present invention and its fabrication method make it possible to dye a dye receiving layer through a dry process by using a sublimatable dye, so as to, and greatly simplify and shorten the fabrication process. As a result, the cost can greatly be cut down. The optical characteristics of the device are superior to those of a system using pigment because dye is used. Moreover, three primary color patterns have the same film thickness. Furthermore, it is possible to further improve the flatness of the films because they are covered with a protective overcoat, and to minimize the variation of the gaps between top and bottom substrates, which is the major factor influencing the optical characteristics of a liquid crystal device when fabricating it. As a result, it is possible to control the variation of the optical characteristics, such as the contrast in the liquid crystal device. Moreover, it is possible to improve a low heat resistance of the sublimatable dye, which is a disadvantage of the dye by forming a protective area against dye diffusion between color patterns of a colored layer and covering the color patterns with a material of high heat resistance.

We claim:

1. A method of fabricating a color liquid crystal display device comprising:

forming a black matrix over a substrate using a macromolecular material containing a material with a low light transmittance, the black matrix having patterns with gaps therebetween;

applying a transparent dye receiving layer of a negative-type photosensitive material over the black matrix and filling the gaps between the black matrix patterns;

exposing the dye receiving layer to light by a single back exposure process of the dye receiving layer using the patterns of the black matrix as a mask;

forming patterns of the dye receiving layer, corresponding to three primary colors, with gaps between the patterns of the dye receiving layer, through a single development process of the dye receiving layer;

coloring the patterns of the dye receiving layer into three primary colors by a thermal dye transfer method, so as to form colored patterns; and forming a transparent protective overcoat on the black matrix and on the colored patterns of the dye receiving layer.

2. A method of fabricating a color liquid crystal display device, comprising:

applying a transparent dye receiving layer of photosensitive resin over a substrate;

forming patterns of the dye receiving layer by exposing the dye receiving layer to a single light exposure and performing a single development process, the patterns being divided by gaps;

coloring the patterns in three primary colors by a thermal dye transfer method, so as to form colored patterns;

applying a macromolecular material containing a material with a low light transmittance over the colored patterns and filling the gaps between the colored patterns;

curing the macromolecular material by a single back exposure process from the substrate side;

pattern-forming a black matrix by a single development process of the macromolecular material; and forming a transparent protective overcoat on the colored patterns of the dye receiving layer and on the black matrix.

3. The method according to claim 1 or 2, wherein the colored patterns and the black matrix are so formed that the difference in the film thickness between the patterns and the black matrix is 0.5 µm or less.

4. The method according to claims 1 or 2, wherein a thickness of the dye receiving layer is less than 1.5 µm.

5. A method of fabricating a color liquid crystal display device, comprising:

applying a transparent dye receiving layer made from photosensitive resin over a substrate;

exposing the dye receiving layer to a single light exposure process and a single development process, so as to form patterns of the dye receiving layer, the patterns being divided by gaps;

coloring the patterns into three primary colors by a thermal dye transfer method, so as to form colored patterns;

and forming a protective overcoat on the colored patterns.

6. The method according to any one of claims 1, 2 and 5, wherein a transparent electrode is formed on the protective overcoat.

* * * * *